United States Patent
Chiu et al.

(10) Patent No.: US 8,896,570 B2
(45) Date of Patent: Nov. 25, 2014

(54) DETECTING METHOD FOR A TOUCH DEVICE

(71) Applicant: Elan Microelectronics Corporation, Hsinchu (TW)

(72) Inventors: Ching-Ting Chiu, New Taipei (TW); Po-Hao Kuo, Taoyuan County (TW); Chia-Hsing Lin, Hsinchu (TW)

(73) Assignee: Elan Microelectronics Corp., Hsinchu (TW)

( * ) Notice: Subject to any disclaimer, the term of this patent is extended or adjusted under 35 U.S.C. 154(b) by 124 days.

(21) Appl. No.: 13/841,775

(22) Filed: Mar. 15, 2013

(65) Prior Publication Data

US 2014/0160060 A1    Jun. 12, 2014

(30) Foreign Application Priority Data

Dec. 7, 2012    (TW) .............................. 101146021 A

(51) Int. Cl.
*G09G 5/00*    (2006.01)
*G06F 3/044*   (2006.01)

(52) U.S. Cl.
CPC ...................................... *G06F 3/044* (2013.01)
USPC ........................................ 345/174; 178/18.06

(58) Field of Classification Search
CPC ....... G06F 3/0416; G06F 3/0418; G06F 3/044
USPC ................................ 345/173, 174; 178/18.06
See application file for complete search history.

(56) References Cited

U.S. PATENT DOCUMENTS

| | | | |
|---|---|---|---|
| 2010/0214253 A1* | 8/2010 | Wu et al. ........................ | 345/174 |
| 2012/0056851 A1 | 3/2012 | Chen et al. | |
| 2012/0262395 A1 | 10/2012 | Chan | |
| 2013/0076700 A1* | 3/2013 | Chiu ............................. | 345/179 |
| 2013/0138387 A1* | 5/2013 | Tu et al. ....................... | 702/141 |

* cited by examiner

*Primary Examiner* — Tom Sheng
(74) *Attorney, Agent, or Firm* — Muncy, Geissler, Olds & Lowe, P.C.

(57) ABSTRACT

A detecting method for a touch device, the method includes the steps of reading all sensed values of a frame associated with the touch device, computing a difference between a maximum sensed value and a minimum sensed value of all the sensed values of the frame, comparing the difference with a base value to generate a comparison result and executing a corresponding operation based on the comparison result.

25 Claims, 11 Drawing Sheets

US 8,896,570 B2

DETECTING METHOD FOR A TOUCH DEVICE

CROSS REFERENCE TO RELATED APPLICATION

This application claims priority to Taiwan Patent Application No. 101146021 filed on Dec. 7, 2012.

BACKGROUND OF THE INVENTION

The present invention relates to the field of touch devices, and more particularly, to a detecting method for a touch device.

Detecting methods for a touch device have been disclosed in the prior art. According to the prior art detecting methods, whether there is an object in contact with a touch panel of the touch device is determined by comparing all sensed values of a base frame that are pre-stored in a memory are compared with all sensed values of a frame that is read at a subsequent time point. However, if there is any flaw in the pre-stored base frame, the comparison result may lead to malfunction of the touch device.

It may therefore desirable to have a detecting method for a touch device to overcome the aforementioned defects.

BRIEF SUMMARY OF THE INVENTION

Examples of the present invention may provide a detecting method for a touch device, which comprises steps of: reading all sensed values of a frame associated with the touch device; computing a difference between a maximum sensed value and a minimum sensed value of all the sensed values of the frame; comparing the difference with a base value so as to generate a comparison result and executing a corresponding operation based on the comparison result.

Some examples of the present invention may provide a detecting method for a touch device, which comprises steps of: defining a plurality of continuous time points; reading, at each of the plurality of continuous time points, all sensed values of a frame associated with the touch device corresponding to the time point; computing a difference between a maximum sensed value and a minimum sensed value of all the sensed values of a frame read at each of the time points; comparing the difference computed at each of the time points with a base value so as to generate a comparison result and executing a corresponding operation based on the comparison result.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
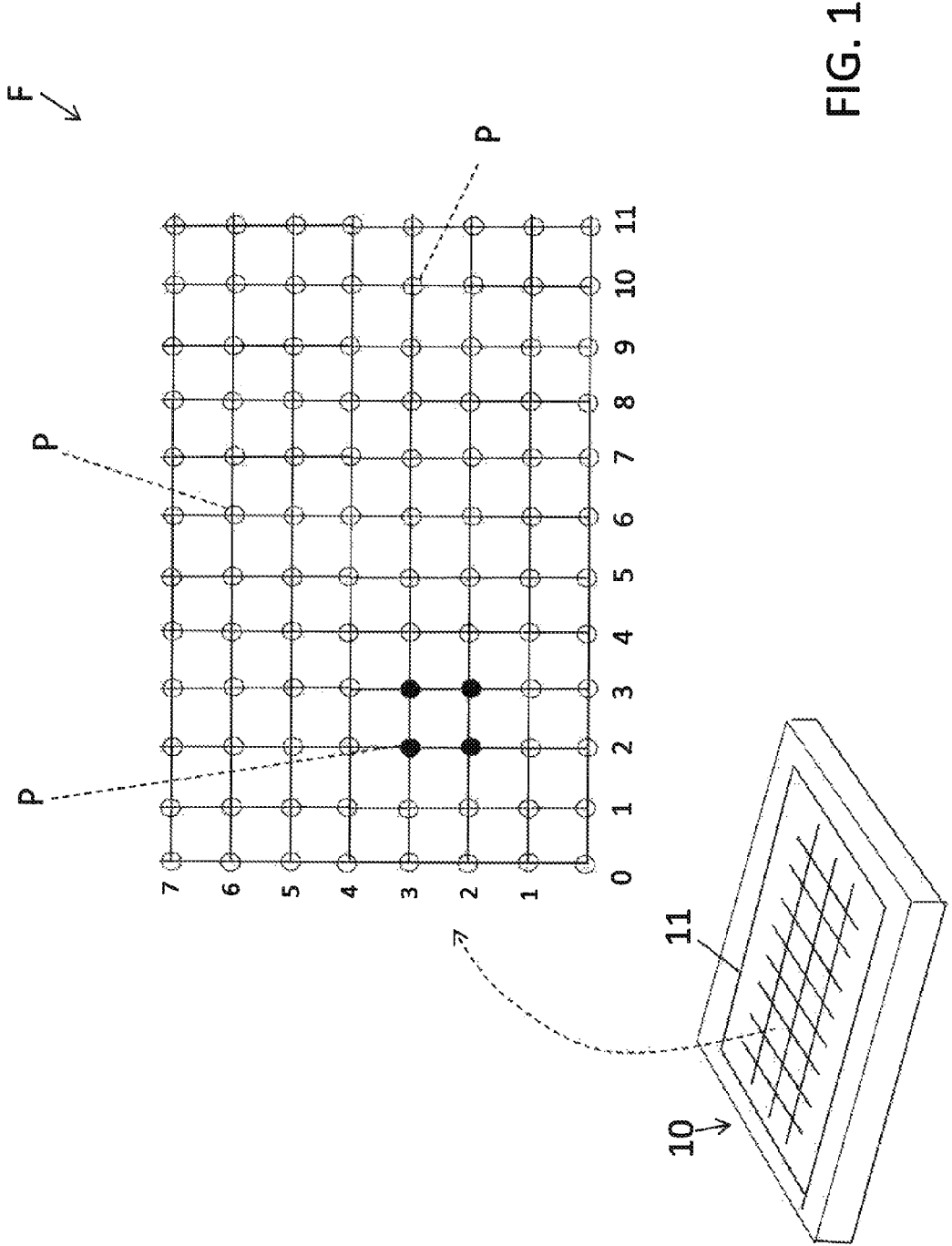
FIG. 1 is a schematic view of a frame associated with a touch device.

FIG. 1 is a schematic view of a frame associated with a touch device. As shown in FIG. 1, a touch panel 11 of the touch device 10 may include a plurality of sensing lines arranged in rows and columns, and a plurality of sensing points P are formed at intersections of the rows and the columns of the sensing lines. In this embodiment, the touch device 10 reads sensed value of each of the sensing points P on the touch device 10 by mutual-capacitance scanning and takes the sensed values as a frame F; however, this is only illustrated as an example but is not to limit the present invention. In another embodiment of the present invention, the touch device 10 may also read sensed values of all the sensing lines by self-capacitance scanning and take the sensed values as the frame F.

Figure 2:
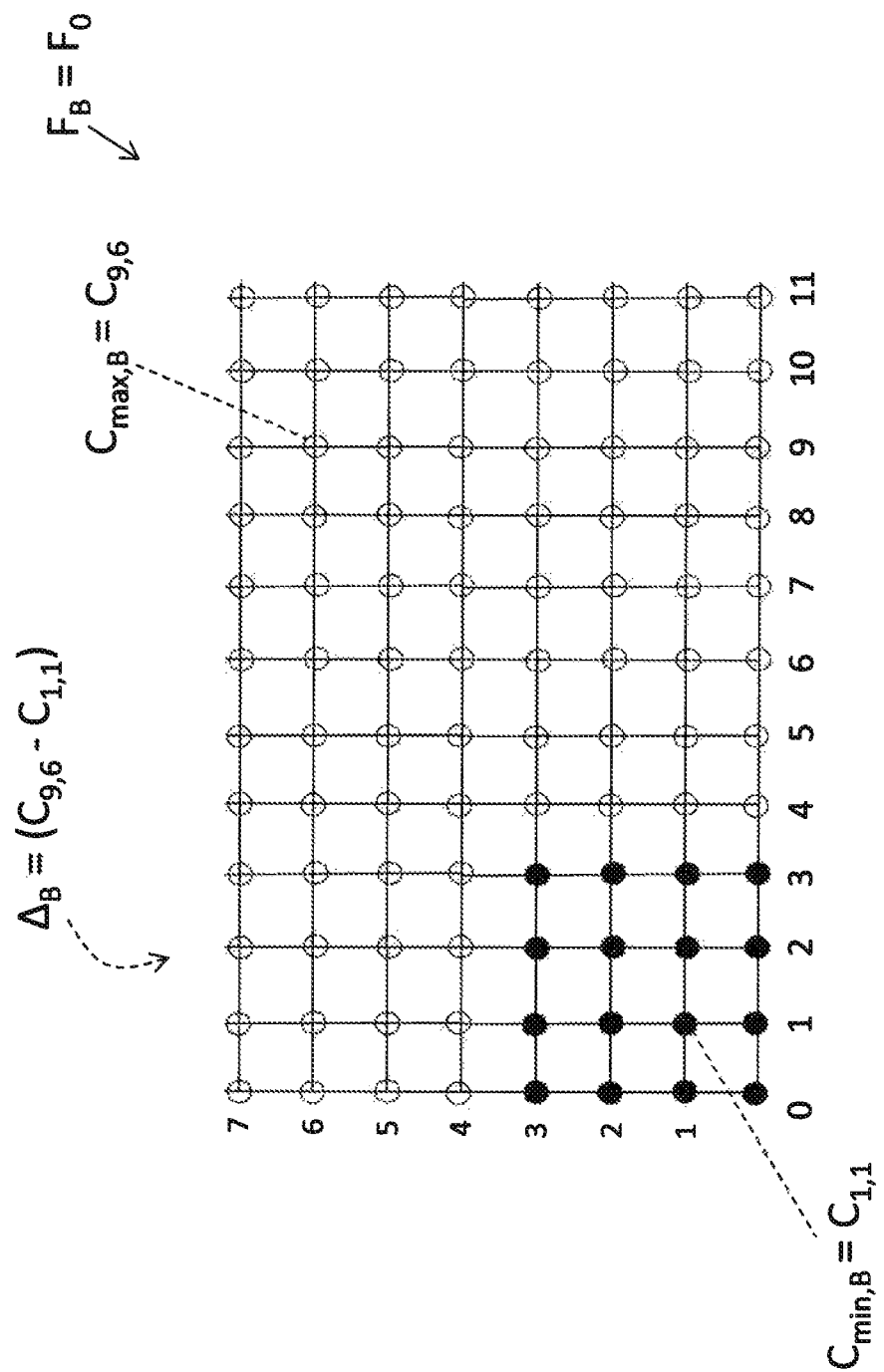
FIG. 2 is a schematic view illustrating the computation of the difference associated with the frame.
Figure 3:
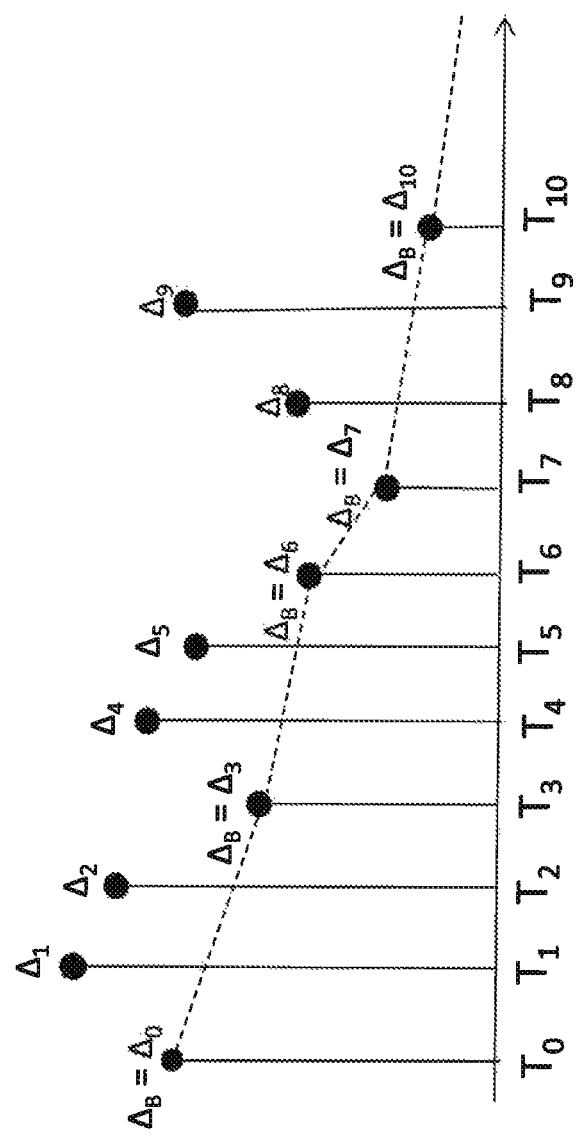
FIG. 3 is a schematic view of a detecting method for a touch device according to an embodiment of the present invention.

FIG. 2 is a schematic view illustrating the computation of the difference associated with the frame. The touch device 10 reads the frame F at each time point (including the power-on time point $T_0$) after being powered on. The frame (referred to as "the initial frame $F_0$" in the following description) read by the touch device 10 at the power-on time point $T_0$ is stored in a memory and is used as a base frame $F_B$. Moreover, the touch device 10 includes a difference between a maximum sensed value $C_{max, B}$ and a minimum sensed value $C_{min, B}$ of all the sensed values of the base frame $F_B$, and sets the difference as a base value $\Delta_B$. For example, as shown in FIG. 3, if a user's palm contacts a lower left region of the touch panel 11 of the touch device 10 when the touch device 10 is powered on, sensed values $C_{0, 0}, C_{0, 1}, \ldots C_{3, 2}, C_{3, 3}$ of the sensing points corresponding to the lower left region of the touch panel will be smaller than sensed values of sensing points corresponding to other regions of the touch panel. The maximum sensed value $C_{max, B}$ of the base frame $F_B$ may be, for example, $C_{9, 6}$, and the minimum sensed value $C_{min, B}$ of the base frame $F_B$ may be, for example, $C_{1, 1}$, and the base value $\Delta_B$ is ($C_{9, 6} - C_{1, 1}$) in this example.

After being powered on, the touch device 10 reads sensed values corresponding to sensing points of a frame $F_n$ at each time point $T_n$, computes a difference $\Delta_n$ between a maximum sensed value $C_{max,\,n}$ and a minimum sensed value $C_{min,\,n}$ of the sensed values corresponding to the sensing points of the frame $F_n$, compares the difference $\Delta_n$ with the base value $\Delta_B$ to generate a comparison result, and executes an operation associated with the touch device 10 based on the comparison result, as will be described in detail below.

FIG. 3 is a schematic view of a detecting method for a touch device according to an embodiment of the present invention. As shown in FIG. 3, the touch device 10 computes the difference $\Delta_n$ between the maximum sensed value $C_{max,\,n}$ and the minimum sensed value $C_{min,\,n}$ at each time point $T_n$. For example, the touch device 10 computes a difference $\Delta_1$ at a time point $T_1$ and computes a difference $\Delta_2$ at a time point $T_2$, and so on. The touch device 10 computes a difference $\Delta_{10}$ at a time point $T_{10}$.

At the time point $T_1$, the touch device 10 compares the computed difference $\Delta_1$ with the base value $\Delta_B$. In this embodiment, since the difference $\Delta_1$ is greater than the base value $\Delta_B$, the base value $\Delta_B$ and the base frame $F_B$ is not updated; that is, the base value $\Delta_B$ is retained as the difference $\Delta_0$ and the base frame $F_B$ is retained as the initial frame $F_0$.

Subsequently, at the next time point $T_2$, the touch device 10 compares the computed difference $\Delta_2$ with the base value $\Delta_B$. In this embodiment, since the difference $\Delta_2$ is greater than the base value $\Delta_B$, the base value $\Delta_B$ and the base frame $F_B$ is still not updated; that is, the base value $\Delta_B$ is still retained as the difference $\Delta_0$, and the base frame $F_B$ is still retained as the initial frame $F_0$.

Subsequently, at the next time point $T_3$, the touch device 10 compares the computed difference $\Delta_3$ with the base value $\Delta_B$. At this point, since the difference $\Delta_3$ is smaller than the base value $\Delta_B$, the touch device 10 updates the base value $\Delta_B$ and the base frame $F_B$. The base value $\Delta_B$ is updated to be the difference $\Delta_3$; and the base frame $F_B$ is updated to be a frame $F_3$ read at the time point $T_3$.

As the above embodiment, the touch device 10 compares the differences $\Delta_4$, $\Delta_5$ and $\Delta_6$, which are computed at the subsequent time points $T_4$, $T_5$ and $T_6$ respectively, with the updated base value $\Delta_B$ ($\Delta_B=\Delta_3$). Since the difference $\Delta_6$ is smaller than the updated base value $\Delta_B$, the base value $\Delta_B$ is further updated, and the further updated base value $\Delta_B$ is equal to the difference $\Delta_6$. Meanwhile, the base frame $F_B$ is further updated, and the further updated base frame $F_B$ is a frame $F_6$ read at the time point $T_6$.

According to the above embodiment, since the difference $\Delta_7$ computed at the subsequent time point $T_7$ is smaller than the further updated base value $\Delta_B$, the base value $\Delta_B$ is further updated to be the difference $\Delta_7$. Meanwhile, the base frame $F_B$ is further updated to be a frame $F_7$ read at the time point $T_7$, and so on. At the time point $T_{10}$, the base value $\Delta_B$ is further updated to be the difference $\Delta_{10}$, and the base frame $F_B$ is further updated to be a frame $F_{10}$ read at the time point $T_{10}$.

According to the above embodiment, the base value $\Delta_B$ is updated to be a smaller value successively. The smaller the base value $\Delta_B$, the more uniformly all the sensed values of the corresponding base frame $F_B$ are distributed, which directs to a condition that no object is sensed when being in contact with the touch panel 11 with a smaller sensed value. Therefore, as the base value $\Delta_B$ decreases successively, the corresponding base frame $F_B$ becomes more flawless.

In other words, the ideal base frame $F_B$ corresponds to sensed values of the sensing points which are not affected, that directs to a condition that no object is in contact with the touch panel 11. In such condition, the sensed values of the sensing points shall be approximate values with small differences therebetween. However, as there is an object in contact with the touch panel 11, the sensed values of sensing points affected by the object will vary greatly. Therefore, the difference $\Delta_n$ between the maximum sensed value $C_{max,\,n}$ and the minimum sensed value $C_{min,\,n}$ of the sensing points of the same frame F will be greater than the difference (i.e., the base value $\Delta_B$) of the ideal base frame $F_B$. Therefore, by comparing the difference $\Delta_n$ between the maximum sensed value $C_{max,\,n}$ and the minimum sensed value $C_{min,\,n}$ of each frame F, the present invention can determine whether to update the base frame $F_B$ and the base value $\Delta_B$. In this way, the base frame $F_B$ can be successively updated as a frame with a smaller difference so that the updated base frame $F_B$ is close to the ideal frame $F_B$.

Thus, even if an object (e.g., the palm of the user) accidentally makes contact with the touch panel 11 when the touch device 10 is powered on, and given that the frame $F_0$ read at the power-on time point $T_0$, which is affected by the object, is used as the base frame $F_B$, the affected base frame $F_B$ can still be updated as a more ideal base frame by means of the updating mechanism of the present invention.

Figure 4:
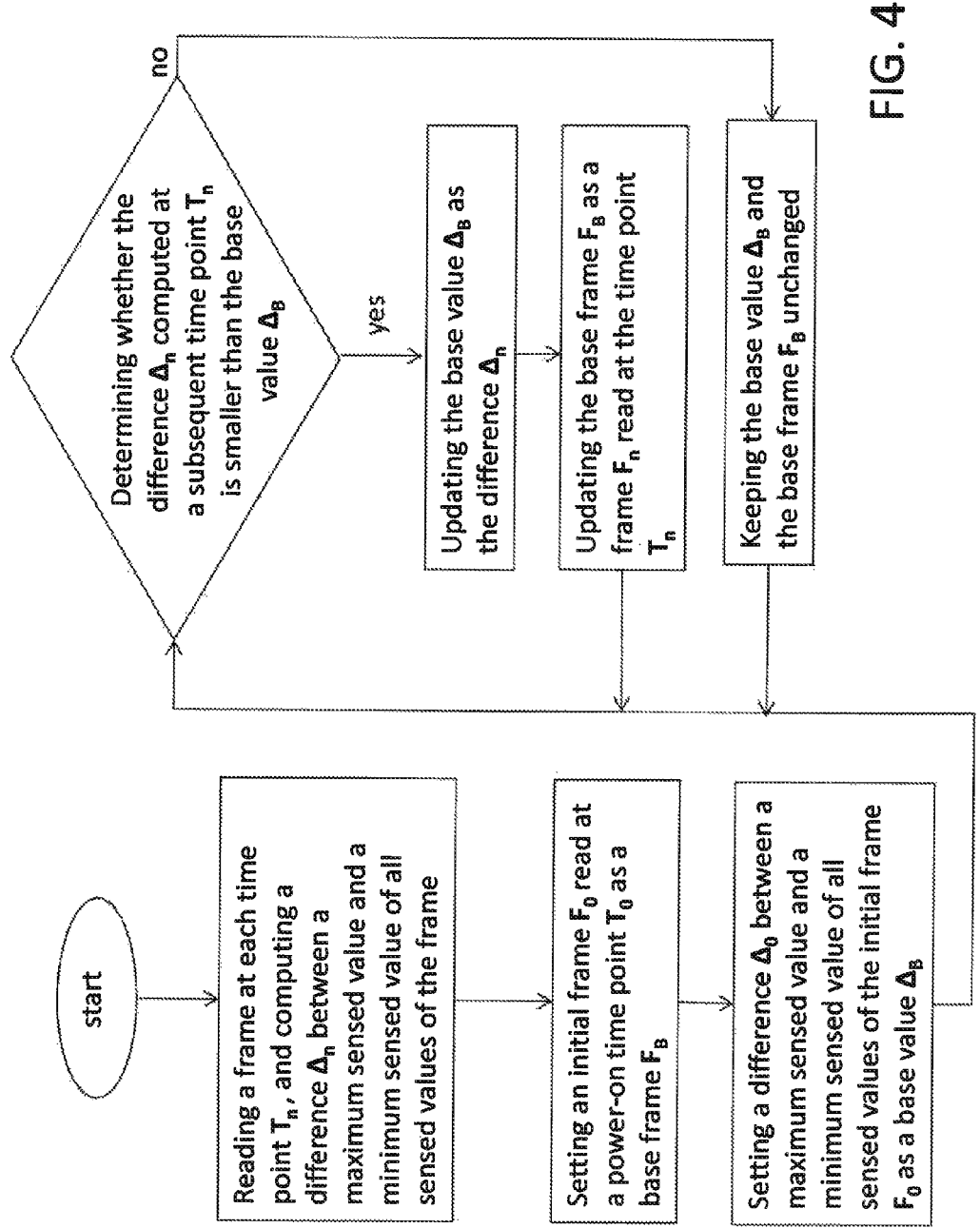
FIG. 4 is a flowchart of the detecting method shown in FIG. 3.

A flowchart of the aforementioned embodiment is as shown in FIG. 4

Figure 5:
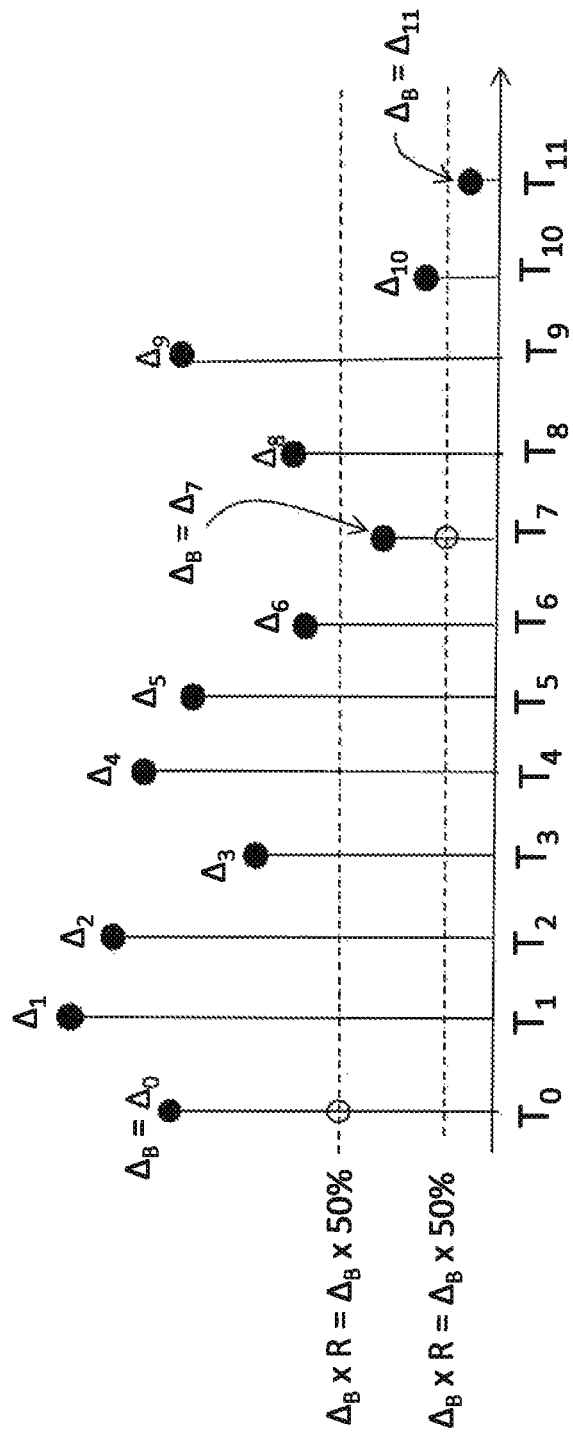
FIG. 5 is a schematic view of a detecting method for a touch device according to another embodiment of the present invention.

FIG. 5 is a schematic view of a detecting method for a touch device according to another embodiment of the present invention. In this embodiment of the present invention, the touch device 10 compares the difference $\Delta_n$ computed at the subsequent time point $T_n$ with a product of the base value $\Delta_B$ multiplied by a predetermined scaling factor R. If the difference $\Delta_n$ is smaller than the product of the base value $\Delta_B$ multiplied by the predetermined scaling factor R, the base value $\Delta_B$ is updated to be the difference $\Delta_n$, and the base frame $F_B$ is updated to be a frame $F_n$ read at the time point $T_n$. Otherwise, the base value $\Delta_B$ and the base frame $F_B$ are kept unchanged. In this embodiment, the predetermined scaling factor R is smaller than or equal to 1.

Furthermore, as shown in FIG. 5, the difference $\Delta_0$ computed at the power-on time point $T_0$ is set as the base value $\Delta_B$ and the frame $F_0$ read at the power-on time point $T_0$ is set to be the base frame $F_B$. Moreover, the predetermined scaling factor R is set as 50% (but is not limited thereto), and the difference $\Delta_n$ computed at the subsequent time point $T_n$ is compared with ($\Delta_B \times 50\%$).

Since the differences $\Delta_1$ to $\Delta_6$ computed at the subsequent time points $T_1$ to $T_6$ are all greater than ($\Delta_B \times 50\%$), the base value $\Delta_B$ and the base frame $F_B$ are not updated.

Thereafter, since the difference $\Delta_7$ computed at the time point $T_7$ is smaller than ($\Delta_B \times 50\%$), the base value $\Delta_B$ is updated to be the difference $\Delta_7$. Meanwhile, the base frame $F_B$ is updated to be a frame $F_7$ read at the time point $T_7$.

Thereafter, the differences $\Delta_8$ to $\Delta_{11}$ computed at the subsequent time points $T_8$ to $T_{11}$ are compared with ($\Delta_B \times 50\%$) (wherein the base value $\Delta_B$ has been updated to be the difference $\Delta_7$). Since the difference $\Delta_{11}$ computed at the time point $T_{11}$ is smaller than ($\Delta_B \times 50\%$), the base value $\Delta_B$ is further updated to be the difference $\Delta_{11}$. Meanwhile, the base frame $F_B$ is further updated to be a frame $F_{11}$ read at the time point $T_{11}$.

Figure 6:
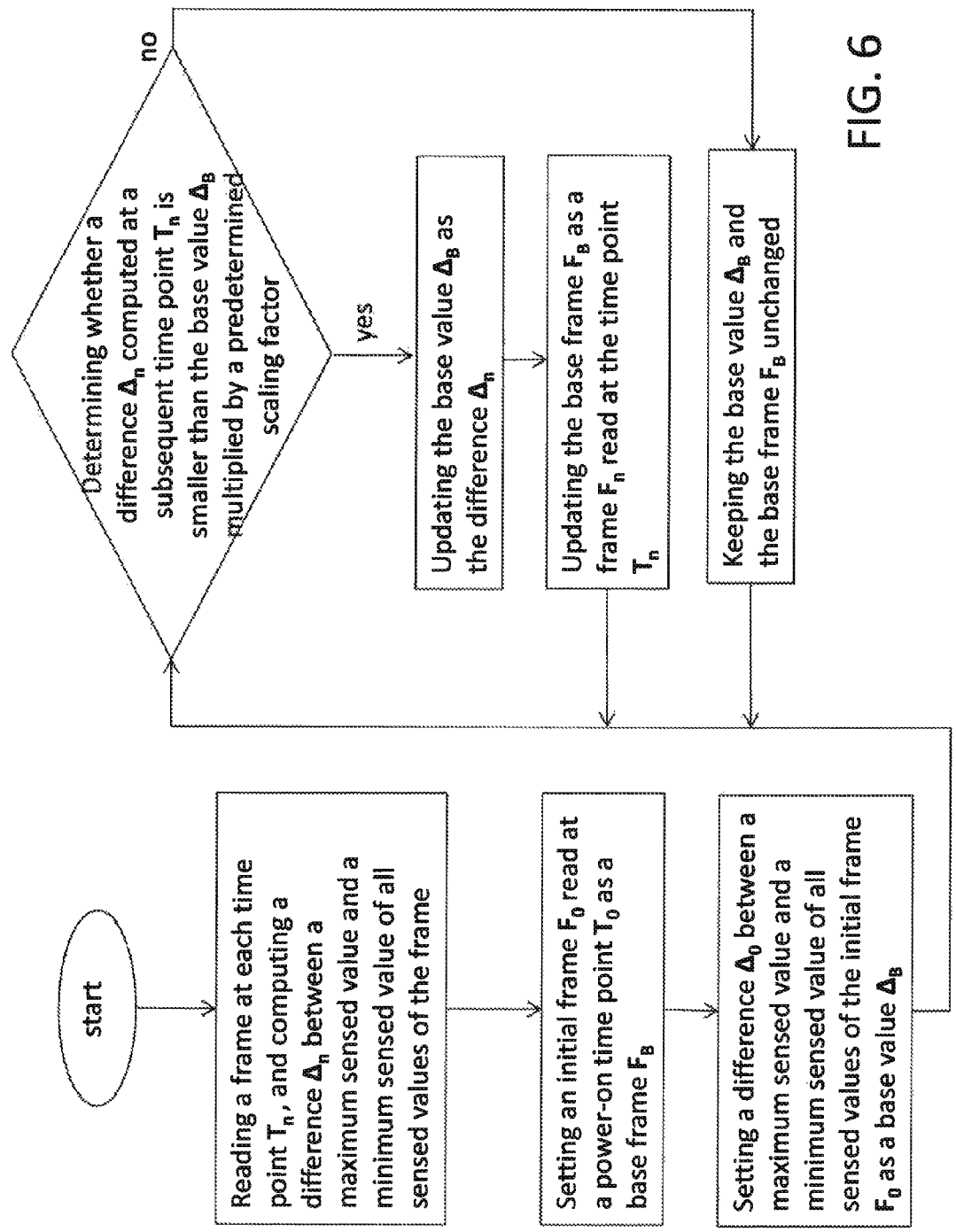
FIG. 6 is a flowchart of the detecting method shown in FIG. 5.

A flowchart of the aforementioned embodiment is as shown in FIG. 6.

Figure 7:
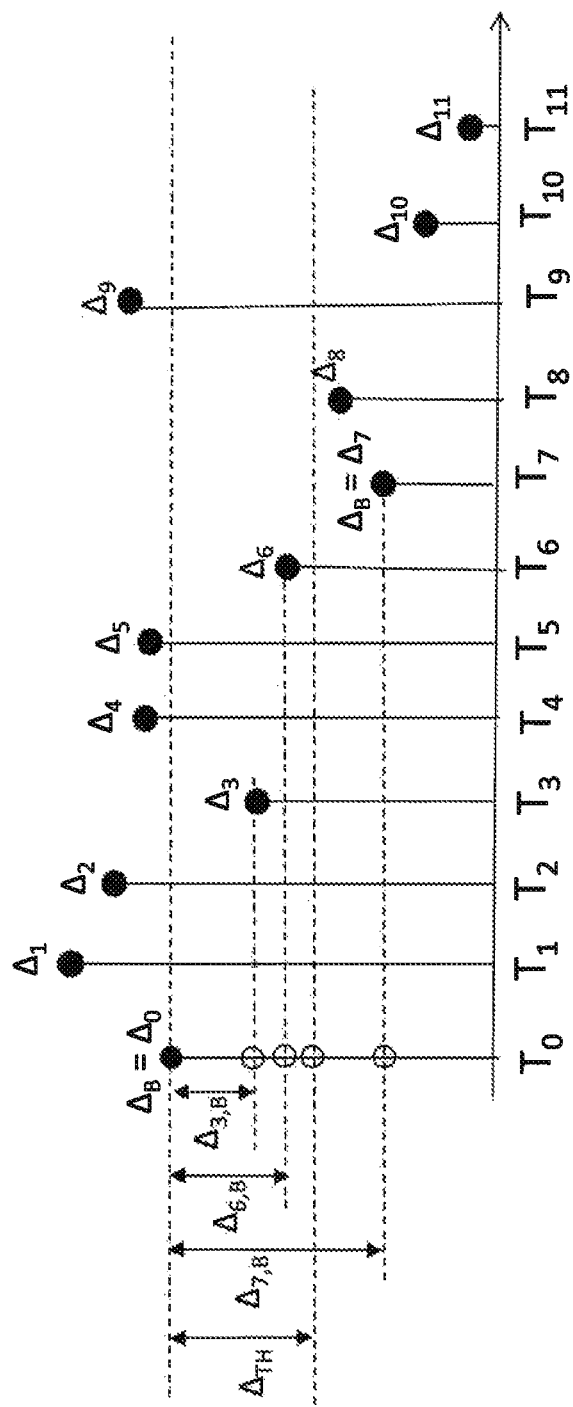
FIG. 7 is a schematic view of a detecting method for a touch device according to yet another embodiment of the present invention.

FIG. 7 is a schematic view of a detecting method for a touch device according to another embodiment of the present invention. In this embodiment of the present invention, the touch device 10 compares the difference $\Delta_n$ computed at the subsequent time point $T_n$ with the base value $\Delta_B$. If the difference $\Delta_n$ is smaller than the base value $\Delta_B$, and if an absolute value $|\Delta_{n,B}|$ of a difference value $\Delta_{n,B}$ between the difference $\Delta_n$ and the base value $\Delta_B$ is greater than a predetermined threshold $\Delta_{TH}$ (wherein the predetermined threshold $\Delta_{TH}$ is a positive value), the base value $\Delta_B$ is updated to be the difference $\Delta_n$, and the base frame $F_B$ is updated to be a frame $F_n$ read at the subsequent time point $T_n$. Otherwise, the base value $\Delta_B$ and the base frame $F_B$ are kept unchanged.

Furthermore, as shown in FIG. 7, the difference $\Delta_0$ computed at the power-on time point $T_0$ is set to be the base value $\Delta_B$, and the frame $F_0$ read at the power-on time point $T_0$ is set to be the base frame $F_B$. Since the differences $\Delta_1$ and $\Delta_2$ computed at the subsequent time points $T_1$ and $T_2$ respectively are greater than the base value $\Delta_B$, the base value $\Delta_B$ and the base frame $F_B$ are kept unchanged.

The difference $\Delta_3$ computed at the subsequent time point $T_3$ is smaller than the base value $\Delta_B$ and the absolute value $|\Delta_{3,B}|$ of the difference value $\Delta_{3,B}$ between the difference $\Delta_3$ and the base value $\Delta_B$ is smaller than the predetermined threshold $\Delta_{TH}$, the base value $\Delta_B$ and the base frame $F_B$ are still kept unchanged.

Next, since the differences $\Delta_4$ and $\Delta_5$ computed at the subsequent time points $T_4$ and $T_5$ respectively are greater than the base value $\Delta_B$, the base value $\Delta_B$ and the base frame $F_B$ are kept unchanged. Thereafter, the difference $\Delta_6$ computed at the subsequent time point $T_6$ is smaller than the base value $\Delta_B$ and the absolute value $|\Delta_{6,B}|$ of the difference value $\Delta_{6,B}$ between the difference $\Delta_6$ and the base value $\Delta_B$ is still smaller than the predetermined threshold $\Delta_{TH}$, the base value $\Delta_B$ and the base frame $F_B$ are still kept unchanged.

Thereafter, the difference $\Delta_7$ computed at the subsequent time point $T_7$ is smaller than the base value $\Delta_B$ and the absolute value $|\Delta_{7,B}|$ of the difference value $\Delta_{7,B}$ between the difference $\Delta_7$ and the base value $\Delta_B$ is greater than the predetermined threshold $\Delta_{TH}$, the base value $\Delta_B$ is updated to be the difference $\Delta_7$, and the base frame $F_B$ is updated to be a frame $F_7$ read at the time point $T_7$.

Figure 8:
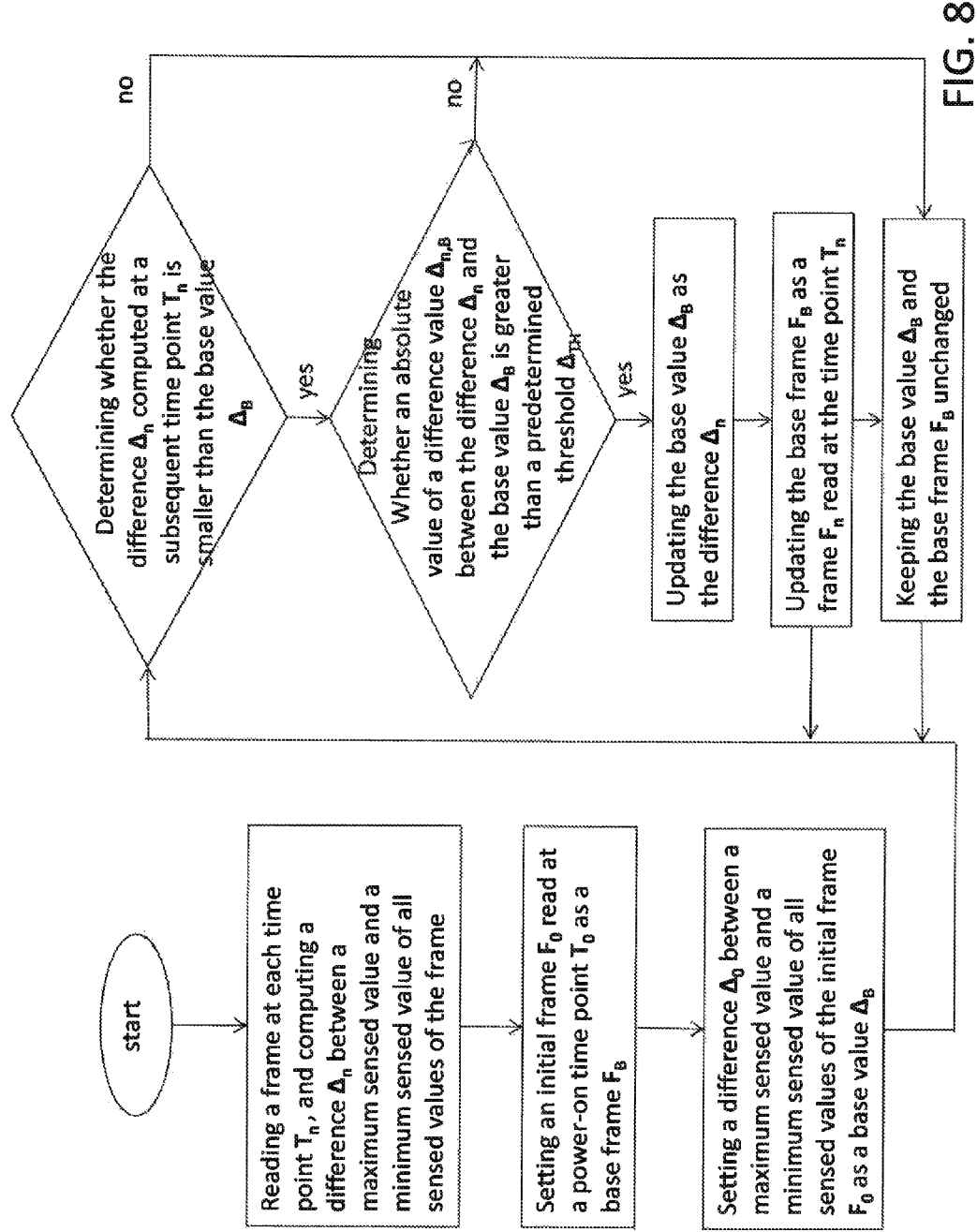
FIG. 8 is a flowchart of the detecting method shown in FIG. 7.

A flowchart of the aforementioned embodiment is as shown in FIG. 8.

Figure 9:
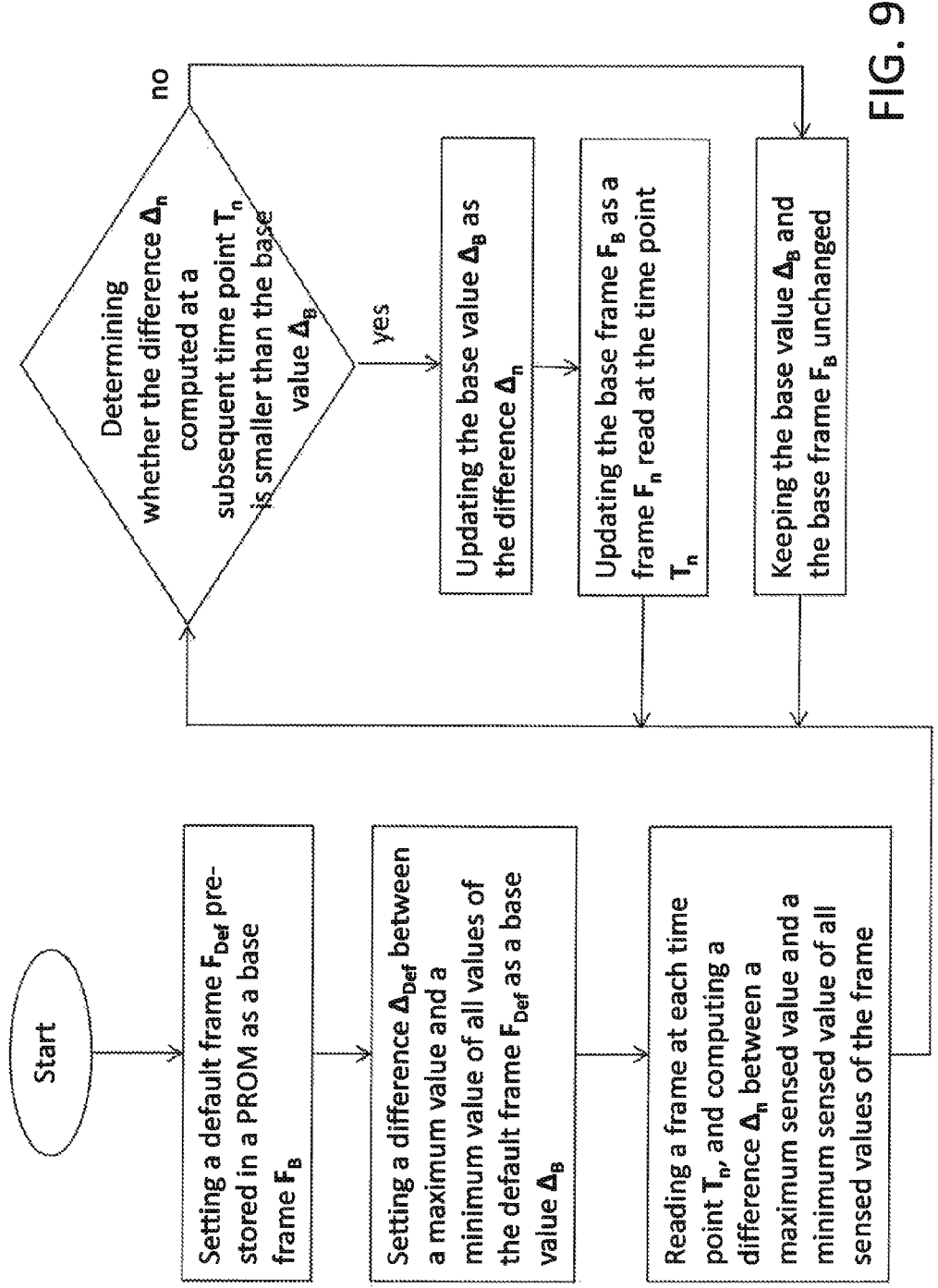
FIG. 9 to FIG. 11 showing the variants of the embodiments shown in FIG. 3 to FIG. 8.
Figure 10:
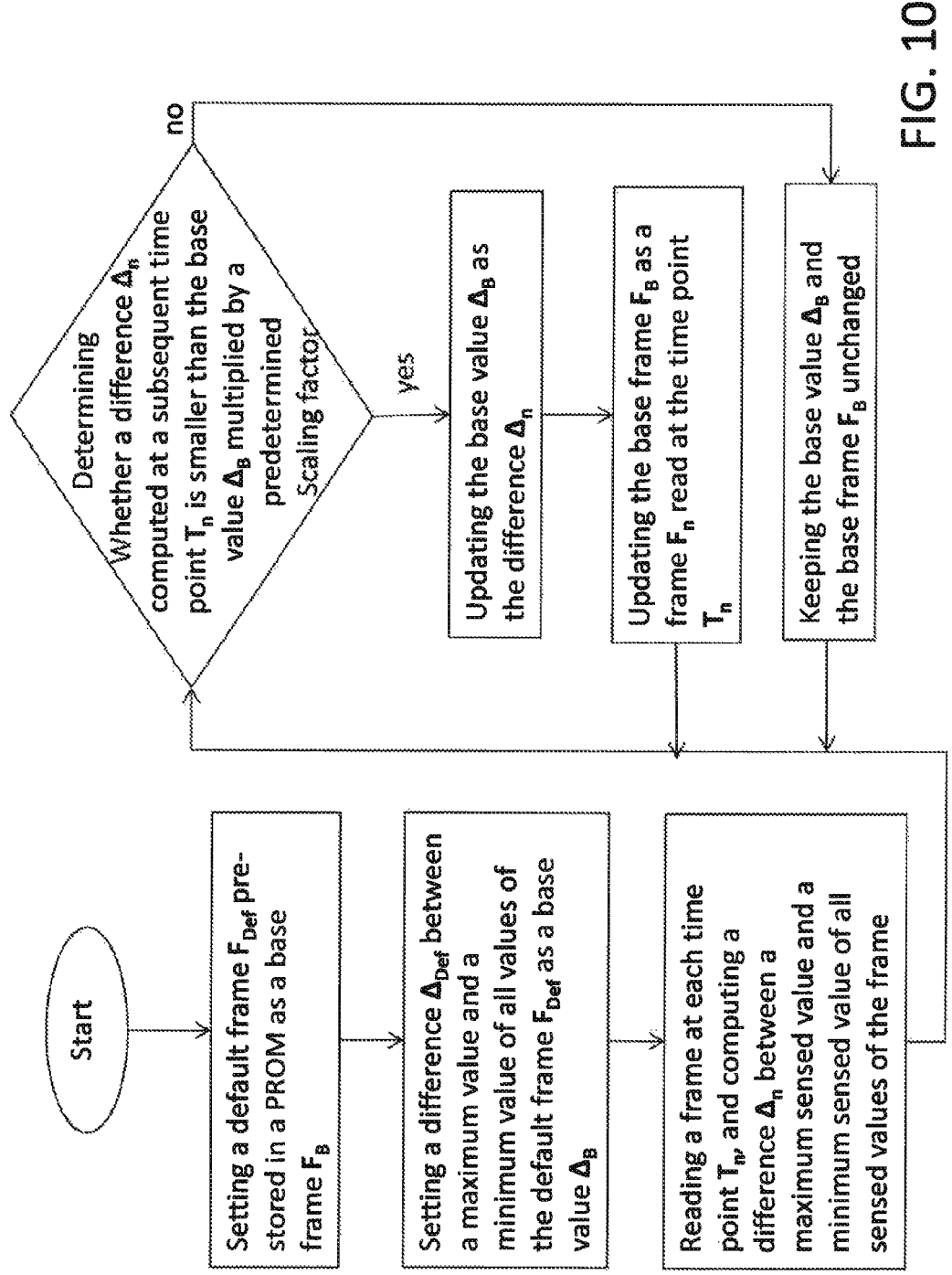
Figure 11:
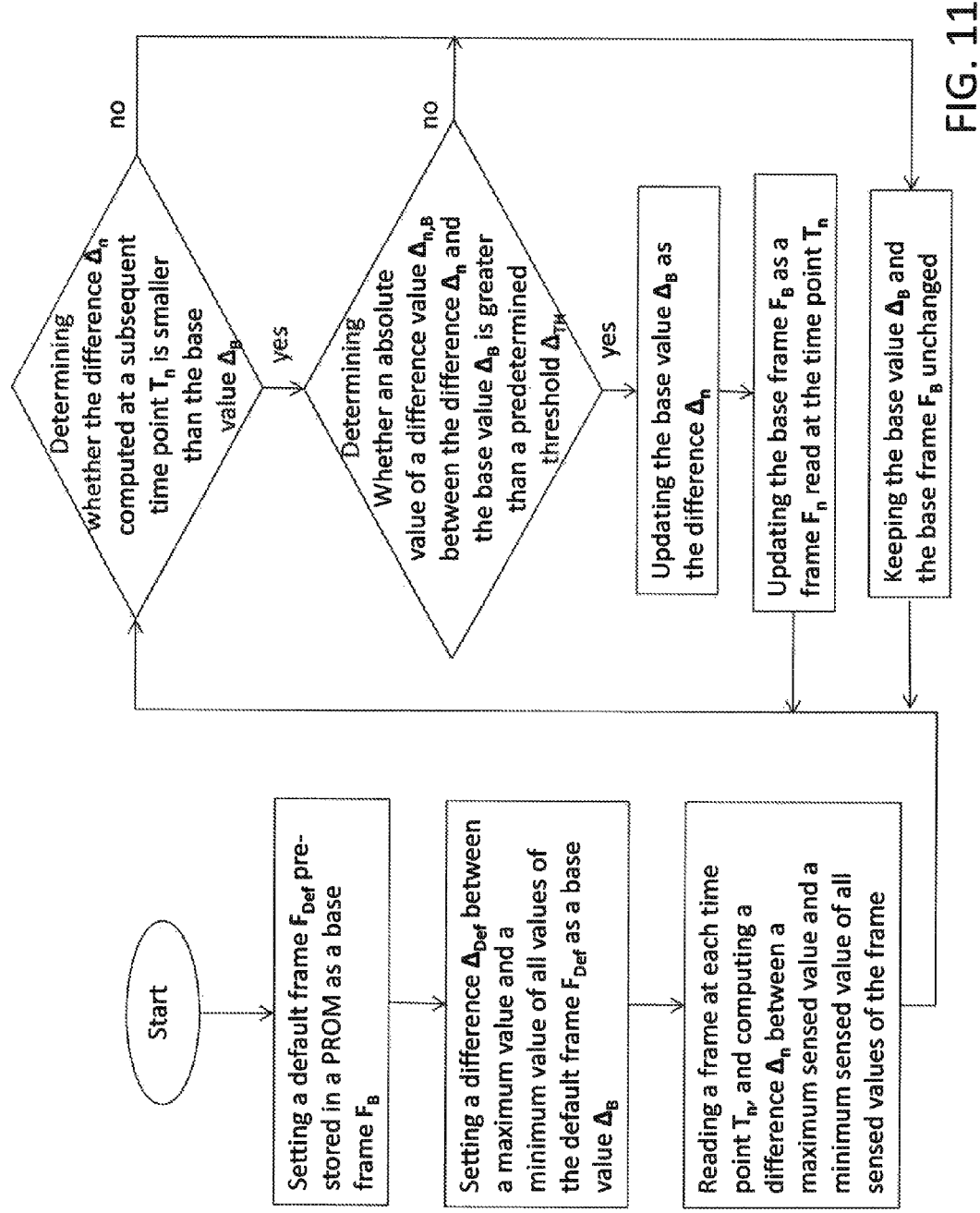

On the other hand, in the variants of the embodiments described above by reference to FIG. 3 to FIG. 8, the base frame $F_B$ is not limited to the frame $F_0$ read by the touch device 10 at the power-on time point $T_0$; instead, the base frame $F_B$ may also be a default frame $F_{Def}$ pre-stored in a programmable read only memory (PROM). Moreover, a difference $\Delta_{Def}$ between a maximum value and a minimum value of all values of the default frame $F_{Def}$ is set to be the base value $\Delta_B$. Flowcharts of the aforementioned variants are shown in FIG. 9 to FIG. 11 respectively.

Furthermore, in the embodiment described above with reference to FIG. 3 to FIG. 4, if the difference $\Delta_n$ computed at the subsequent time point $T_n$ is greater than the base value $\Delta_B$ (the base value $\Delta_B$ may be the difference $\Delta_0$ between the maximum sensed value and the minimum sensed value of the initial frame $F_0$, or the difference $\Delta_{Def}$ between the maximum value and the minimum value of the default frame $F_{Def}$), the touch device 10 determines that there is an object in contact with the touch panel 11. Otherwise, if the difference $\Delta_n$ is smaller than the base value $\Delta_B$, the touch device 10 determines that there is no object in contact with the touch panel 11.

In another embodiment, if the difference $\Delta_n$ is greater than the base value $\Delta_B$ (which represents that there is an object in contact with the touch panel 11; e.g., the user places his/her finger on the touch panel 11), then the touch device 10 will wake up an internal processor thereof and deactivate a sleeping mode of the processor.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A detecting method for a touch device comprising steps of:
    reading all sensed values in a single frame;
    computing a difference between a maximum sensed value and a minimum sensed value of all the sensed values of the frame;
    comparing the difference with a base value to generate a comparison result; and
    executing a corresponding operation based on the comparison result.

2. The detecting method of claim 1, wherein in the step of reading all sensed values in a single frame, the sensed values of the frame corresponding to all sensing points of the touch device are read by mutual-capacitance scanning.

3. The detecting method of claim 1, wherein in the step of reading all sensed values of the frame associated with the touch device, the sensed values of the frame corresponding to all sensing lines of the touch device are read by self-capacitance scanning.

4. The detecting method of claim 1, further comprising steps of:
    pre-storing a base frame; and
    using a difference between a maximum sensed value and a minimum sensed value of all sensed values of the base frame as the base value.

5. The detecting method of claim 4, wherein it is determined that an object exists on the touch device if the difference is greater than the base value, and determined that no object exists on the touch device if the difference is smaller than or equal to the base value.

6. The detecting method of claim 4, wherein if the difference is smaller than the base value, the frame with the difference smaller than the base value replaces an original base frame as an updated base frame, and a difference between a maximum sensed value and a minimum sensed value of all sensed values of the updated base frame is used as an updated base value.

7. The detecting method of claim 6, wherein when the difference is smaller than the base value multiplied by a scaling factor smaller than or equal to one, the base value is updated correspondingly.

8. The detecting method of claim 6, wherein if the difference is smaller than the base value, and if an absolute value of a difference value between the difference and the base value is greater than a threshold, the base value is updated correspondingly.

9. The detecting method of claim 1, wherein when an initial frame is read, the initial frame is stored to be a base frame, and a difference between a maximum sensed value and a minimum sensed value of all sensed values of the base frame is used as the base value.

10. The detecting method of claim 9, wherein it is determined that an object exists on the touch device if the difference is greater than the base value, and determined that no object exists on the touch device if the difference is smaller than or equal to the base value.

11. The detecting method of claim 9, wherein if the difference is smaller than the base value, the frame with the difference smaller than the base value replaces an original base frame as an updated base frame, and a difference between a maximum sensed value and a minimum sensed value of all sensed values of the updated base frame is used as an updated base value.

12. The detecting method of claim 11, wherein when the difference is smaller than the base value multiplied by a scaling factor smaller than or equal to one, the base value is updated correspondingly.

13. The detecting method of claim 11, wherein if the comparison result represents that the difference is smaller than the base value, and represents that an absolute value of a difference value between the difference and the base value is greater than a threshold, the base value is updated correspondingly.

14. The detecting method of claim 1, wherein if the difference is greater than the base value, a sleeping mode of a processor of the touch device is deactivated.

15. A detecting method for a touch device, comprising steps of:
    defining a plurality of continuous time points;
    reading, at each of the plurality of continuous time points, all sensed values in a single frame corresponding to the time point;
    computing a difference between a maximum sensed value and a minimum sensed value of all the sensed values of each of the frames;
    comparing the difference with a base value to generate a comparison result; and
    executing a corresponding operation based on the comparison result.

16. The detecting method of claim 15, further comprising steps of:
    pre-storing a base frame; and
    using a difference between a maximum sensed value and a minimum sensed value of all sensed values of the base frame as the base value.

17. The detecting method of claim 16, wherein if the difference calculated at one of the plurality of continuous time points is smaller than the base value, the base value is updated to be the difference calculated at the time point and the base frame is updated to be a frame read at the time point.

18. The detecting method of claim 17, wherein if the difference calculated at the time point is smaller than the base value multiplied by a scaling factor smaller than or equal to one, the base value is updated to be the difference calculated at the time point, and the base frame is updated to be the frame read at the time point.

19. The detecting method of claim 17, wherein if the difference calculated at the time point is smaller than the base value, and if an absolute value of a difference value between the difference calculated at the time point and the base value is greater than a threshold, the base value is updated to be the difference calculated at the time point, and the base frame is updated to be the frame read at the time point.

20. The detecting method of claim 15, wherein a frame read at the first one of the plurality of continuous time points is stored as a base frame, and a difference between a maximum sensed value and a minimum sensed value of all sensed values of the base frame is used as the base value.

21. The detecting method of claim 20, wherein if the difference calculated at one of the plurality of continuous time points is smaller than the base value, the base value is updated to be the difference calculated at the time point and the base frame is updated to be a frame read at the time point.

22. The detecting method of claim 21, wherein if the difference calculated at the time point is smaller than the base value multiplied by a scaling factor smaller than or equal to one, the base value is updated to be the difference calculated at the time point, and the base frame is updated to be the frame read at the time point.

23. The detecting method of claim 21, wherein if the comparison result generated at the time point represents that the difference calculated at the time point is smaller than the base value, and represents that an absolute value of a difference value between the difference calculated at the time point and the base value is greater than a threshold, the base value is updated to be the difference calculated at the time point, and the base frame is updated to be the frame read at the time point.

24. The detecting method of claim 15, wherein it is determined that an object exists on the touch device if the difference calculated at one of the plurality of continuous time points is greater than the base value, and determined that no object exists on the touch device if the difference calculated at one of the plurality of continuous time points is smaller than or equal to the base value.

25. The detecting method of claim 15, wherein if the difference calculated at one of the plurality of continuous time points is greater than the base value, a sleeping mode of a processor of the touch device is deactivated.

* * * * *